(12) United States Patent
Joubert et al.

(10) Patent No.: US 8,915,485 B2
(45) Date of Patent: Dec. 23, 2014

(54) STRAP-TENSIONING DEVICE

(75) Inventors: Xavier Joubert, Würzburg (FR); Thierry Joubert, Ambert (FR)

(73) Assignee: Joubert Productions, Ambert (FR)

( * ) Notice: Subject to any disclaimer, the term of this patent is extended or adjusted under 35 U.S.C. 154(b) by 17 days.

(21) Appl. No.: 13/503,676

(22) PCT Filed: Jul. 21, 2010

(86) PCT No.: PCT/FR2010/051534
§ 371 (c)(1),
(2), (4) Date: Apr. 24, 2012

(87) PCT Pub. No.: WO2011/064477
PCT Pub. Date: Jun. 3, 2011

(65) Prior Publication Data
US 2012/0205601 A1 Aug. 16, 2012

(30) Foreign Application Priority Data

Nov. 25, 2009 (FR) ..................................... 09 58340

(51) Int. Cl.
*B66F 3/00* (2006.01)
*B60P 7/08* (2006.01)

(52) U.S. Cl.
CPC ............... *B60P 7/083* (2013.01); *B60P 7/0846* (2013.01)
USPC .......................... 254/217; 254/218; 24/68 CD (58) Field of Classification Search
CPC ...... B60P 7/083; B60P 7/0846; B60P 7/0853; B60P 7/0823; B25B 25/00; A44B 11/125
USPC ................. 254/217–219, 223, 237–239, 357; 24/68 CD
See application file for complete search history.

(56) References Cited

U.S. PATENT DOCUMENTS

| 3,692,253 | A | * | 9/1972 | Curran | 242/381.4 |
| 4,199,182 | A | * | 4/1980 | Sunesson | 24/68 CD |
| 4,622,721 | A | * | 11/1986 | Smetz et al. | 24/68 CD |
| 5,101,537 | A | * | 4/1992 | Cummings | 24/68 CD |
| 5,271,606 | A | * | 12/1993 | Kamper | 254/217 |
| 5,369,848 | A | * | 12/1994 | Huang | 24/68 CD |
| 5,560,086 | A | * | 10/1996 | Huang | 24/68 CD |
| 5,904,341 | A | * | 5/1999 | Norrby | 254/243 |
| 6,457,701 | B1 | * | 10/2002 | Huang | 254/217 |

(Continued)

FOREIGN PATENT DOCUMENTS

EP 1 151 687 11/2001
WO WO 89/08603 9/1989

*Primary Examiner* — Emmanuel M Marcelo
*Assistant Examiner* — Michael Gallion
(74) *Attorney, Agent, or Firm* — Jordan IP Law, LLC; Todd A. Vaughn (57) ABSTRACT

A strap-tensioning device includes a base that receives a rotatable drum rigidly connected to toothed wheels, and configured to engage a holding pawl; tensioning lever rotatably mounted by hinging onto the drum, and provided with a pawl for driving the toothed wheels; an unlocking pawl configured to release the toothed wheels from the respective engagement thereof with the holding pawl and with the driving pawl, rotatably mounted, independently of the rotation of the tensioning lever, by hinging onto the drum. The unlocking lever is rigidly connected to two parallel cams having the same profile, and configured to simultaneously engage, respectively, the holding pawl and the driving pawl, so as to release the rotation of the drum.

20 Claims, 5 Drawing Sheets

(56) References Cited

U.S. PATENT DOCUMENTS

| | | | |
|---|---|---|---|
| 6,547,218 B2 * | 4/2003 | Landy | 254/217 |
| 6,631,537 B1 * | 10/2003 | Huang | 24/193 |
| 6,880,810 B1 * | 4/2005 | Hu | 254/218 |
| 7,100,901 B2 * | 9/2006 | Gleinser | 254/218 |
| 7,100,902 B1 * | 9/2006 | Lu | 254/218 |
| 7,107,655 B1 * | 9/2006 | Huang | 24/68 CD |
| 7,207,089 B2 * | 4/2007 | Hanson | 24/68 CD |
| 7,281,701 B1 * | 10/2007 | Huang et al. | 254/218 |
| 7,296,326 B2 * | 11/2007 | Madachy et al. | 24/68 CD |
| 7,444,720 B2 * | 11/2008 | Huang | 24/170 |
| 7,448,596 B1 * | 11/2008 | Chang | 254/223 |
| 7,503,736 B1 * | 3/2009 | Chen | 410/100 |
| 7,510,168 B1 * | 3/2009 | Lin | 254/218 |
| 7,651,072 B1 * | 1/2010 | Chang | 254/218 |
| 7,758,023 B2 * | 7/2010 | Chang | 254/218 |
| 7,789,603 B2 * | 9/2010 | Huck | 410/100 |
| 7,854,043 B2 * | 12/2010 | Wang | 24/68 CD |
| 7,861,382 B1 * | 1/2011 | Madachy et al. | 24/68 CD |
| 7,877,846 B1 * | 2/2011 | Chen | 24/68 CD |
| 8,037,580 B2 * | 10/2011 | Huang | 24/68 CD |
| 8,172,203 B2 * | 5/2012 | Chou | 254/225 |
| 8,209,821 B1 * | 7/2012 | Chen | 24/68 CD |
| 8,312,601 B2 * | 11/2012 | Huang | 24/68 CD |
| 8,408,521 B2 * | 4/2013 | Huang | 254/218 |
| 8,458,859 B2 * | 6/2013 | Degen | 24/68 CD |
| 2001/0045548 A1 * | 11/2001 | Landy | 254/217 |
| 2003/0146424 A1 * | 8/2003 | Lee | 254/237 |
| 2005/0133769 A1 * | 6/2005 | Walls | 254/218 |
| 2008/0189921 A1 * | 8/2008 | Tomosue | 24/68 R |
| 2008/0216294 A1 * | 9/2008 | Mamie | 24/68 CD |
| 2009/0013511 A1 * | 1/2009 | Chang | 24/68 CD |
| 2009/0100653 A1 * | 4/2009 | Wang | 24/68 CD |
| 2009/0119892 A1 * | 5/2009 | Breeden et al. | 24/68 CD |
| 2009/0283729 A1 * | 11/2009 | Carlson et al. | 254/218 |
| 2010/0180412 A1 * | 7/2010 | Huang | 24/71 ST |
| 2010/0199473 A1 * | 8/2010 | Long et al. | 24/68 CD |
| 2011/0041300 A1 * | 2/2011 | Lu | 24/68 CD |
| 2012/0110801 A1 * | 5/2012 | Joubert et al. | 24/68 CD |

* cited by examiner

STRAP-TENSIONING DEVICE

CROSS-REFERENCE TO RELATED APPLICATIONS

The present application is a National Stage Application of PCT International Application No. PCT/FR2010/051534 (filed on Jul. 21, 2010), under 35 U.S.C. §371, which claims priority to French Patent Application No. 0958340 (filed on Nov. 25, 2009), which are each hereby incorporated by reference in their respective entireties.

FIELD OF THE INVENTION

The present invention relates to a belt- or strap-tensioning device, better known as a "ratchet."

Such a device is conventionally employed to tension straps, particularly on motor vehicle roof racks, luggage racks and in general terms, whenever it is required to tension a strap for the purpose of securing an item, a piece of luggage, or any kind of product.

BACKGROUND OF THE INVENTION

"Ratchet" systems are now in widespread use for tensioning straps. In the main, they traditionally comprise a base rigidly connected to the end of a strap, the base comprising an axis on which is mounted a rotatable drum around which the other end of the strap, or even another strap, is intended to be wound. This drum is rotated by means of a lever, known as a tensioning lever, that actuates the rotation of the drum in order to allow the other end of the strap to be wound thereupon, thereby tensioning the strap. The axis of the drum is provided with toothed wheels intended to engage with holding pawls mounted on the base, and driving pawls mounted on the tensioning lever, in order respectively to keep the strap tensioned and to drive the drum when the tensioning lever is actuated.

One of the major difficulties with this kind of device lies in releasing the tension, when it is required to release the secured product. Indeed, to effect the release of the rotation of the drum, prior art devices are basically provided with an unlocking lever rigidly connected to the tensioning lever, which needs to be pulled first, in order to release the drum from the driving pawl. Consequently, it is also necessary to fully open the tensioning lever, in other words, move it away from the base to its extreme position, in order to release the drum from the holding pawl. This last stage is not that simple, and short of finding the knack, few users are able to correctly release the drum. This dual operation thus causes a problem precisely because of the tension being exerted on the drum when the strap is stretched.

The targeted objective of this invention is to simplify this unlocking operation.

SUMMARY OF THE INVENTION

To this end, the invention relates to a strap-tensioning device that includes: a base, to one of the ends of which is rigidly connected the end of a strap, and receiving at its other end, a rotatable drum receiving the end of the strap or of another strap, the drum being rigidly connected to two toothed wheels, capable of engaging with a holding pawl meshing by default in the toothed wheels under the action of a resilient return means, and able to slide in the base; a tensioning lever that is rotatably mounted by hinging onto the drum, and provided with a pawl for driving the toothed wheels, meshing by default in the toothed wheels under the action of a resilient return component, able to slide in the lever; and an unlocking lever, capable of releasing the toothed wheels from the respective engagement thereof with the holding pawl and with the driving pawl.

In accordance with the invention, the unlocking lever is rotatably mounted, independently of the rotation of the tensioning lever, by hinging onto the drum.

Additionally, the unlocking lever is rigidly connected to two parallel cams having the same profile and able to simultaneously engage with the holding pawl and with the driving pawl respectively so as to release the rotation of the drum.

In other words, the invention mainly comprises disassociating the tension and tension release functions, something that was not offered by prior art devices. Indeed, by disassociating these two functions, the tension release operation is made easier by a straightforward rotary movement exerted on an unlocking lever, independently of any action on the tensioning lever.

Because of the presence of cams, the profile of which is adapted, the engagement of the holding and driving pawls is released straightforwardly and without effort, thereby releasing the rotation of the drum and, consequently, enabling the tensioned strap to relax.

In accordance with one advantageous feature of the invention, the end of the strap secured to the base is mounted on an axis for winding and storing the strap, which is rotated by means of a crank. Thus, when so required, it becomes possible to store a considerable length of strap, and typically as much as five metres, since it is not stored on the tensioning axis, but on an independent axis.

BRIEF DESCRIPTION OF THE DRAWINGS

The manner in which the invention may be implemented, and the resulting advantages, will become clearer from the following embodiment example, given for information purposes and non-restrictively, supported by the appended drawings.

DETAILED DESCRIPTION OF EMBODIMENTS

Figure 1:
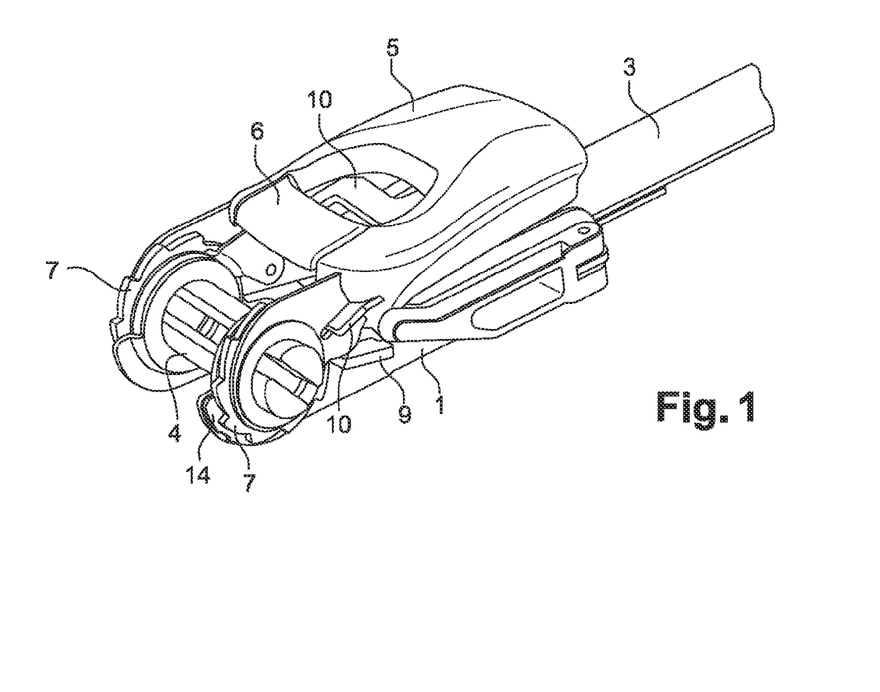
FIG. 1 is a diagrammatic perspective view of the tensioning device in accordance with the invention, in the closed position.

A perspective diagrammatic view of the inventive tensioning device has thus been shown in FIG. 1. Basically, it comprises a base 1, one of the ends of which is rigidly connected to the end of a strap 3. In the case in point, the end of the strap 3 is sewn onto itself around an axis (not shown) of the base 1.

The base 1 comprises two parallel lateral surfaces 18, 19 rigidly connected to each other by a connection plate 20, provided with a point 21 for the application of a resilient return member as mentioned in greater detail below.

The ends of the lateral parallel surfaces 18, 19 of the base 1, opposite to the point of fastening of the strap 3 define two flanges 22, 23, that are also parallel and provided with a central bore 24, and each further defining a substantially semi-circular receiving cradle 25 that is external relative to the flanges.

The central bore 24 of the two flanges 22, 23 is intended to receive, in the manner of a bearing, a rotatable drum 4, on which the other end of the strap 3, or even another strap, is intended to be wound. This drum 4 comprises two half-axes 26, 27 of substantially semi-circular transverse cross-section, separated from one another through the respective engagement thereof with two lateral toothed wheels 7 and 8, each drilled with two orifices 28, 29 of matching shape. The two half-axes 26, 27 are rigidly connected in translatory motion by two folded axes 30, or possibly by caulking or snapping the ends of the half-axes.

On the other hand, in the absence of constraint, the drum 4 is mounted free in rotation, and is therefore able to rotate in one direction or in the other.

The two lateral toothed wheels 7 and 8 are rigidly connected to the drum 4, as will have been understood from the previous description.

The teeth of the wheels 7 are shaped so as to promote the rotation of the drum 4 in one direction and, conversely, to counter the rotation of the drum 4 in the other direction, through the engagement of the teeth with a holding pawl 9, provided in the base 1, and a driving pawl 10, provided in a tension lever 5, described in greater detail later.

Figure 5:
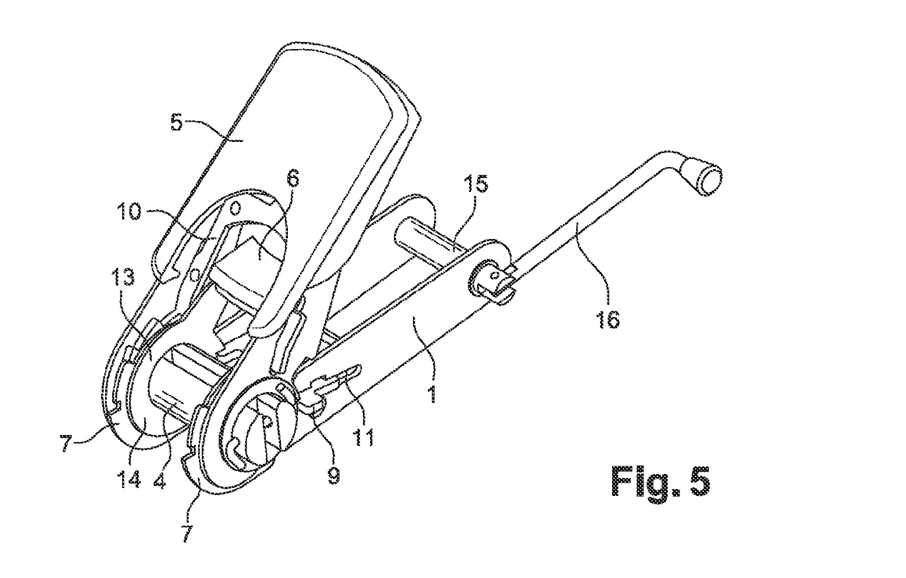
FIG. 5 is a view of the device of FIG. 4, in the tension position.
Figure 8:
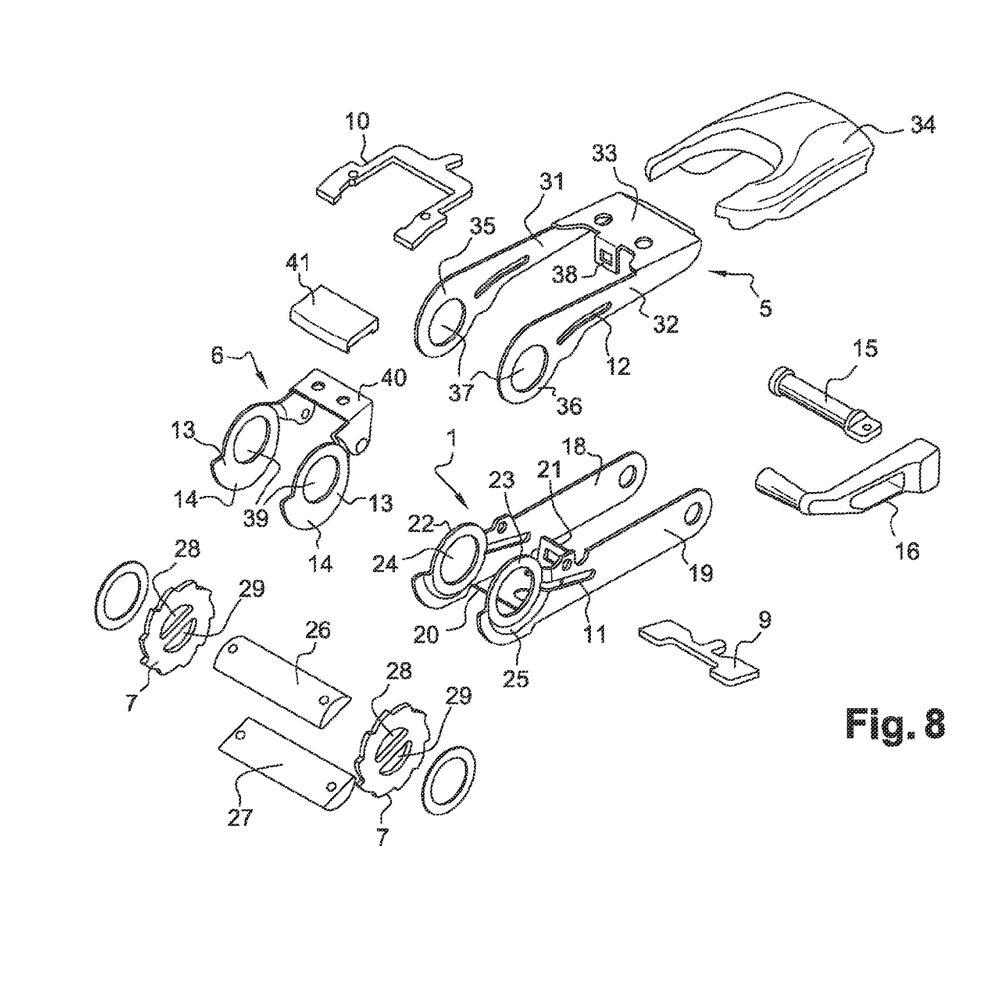
FIG. 8 is an exploded view of the device of FIGS. 4-7 in accordance with the invention.

To be more specific, the holding pawl 9 comprises a rigid blade, made of metal for example, whereof two lateral protuberances are each able to slide in a through aperture 11 which can be better seen in FIG. 5 or in FIG. 8, and is provided in the lateral surfaces 18, 19 of the base 1. The motion of the pawl 9 is purely translatory. The pawl 9 is permanently subject to the action of a resilient return member, typically comprising a spring (not shown), that presses against the projection 21 issuing from the plate 20 connecting the lateral surfaces of the base 1, and causing the pawl 9 to thrust against the teeth of the toothed wheels 7.

The device includes as already stated a tensioning lever 5, which is hinged onto the drum 4. This lever comprises a rigid structure comprising two parallel lateral surfaces 31, 32, rigidly connected to each other by means of a rear plate 33, and able to receive a grip zone 34 which can be snapped on. The ends of the lateral surfaces on the opposite side to the grip zone define two flanges 35, 36, that are also parallel, each being provided with a central bore 37, whereof the internal diameter substantially matches the external diameter of the drum 4. The latter therefore constitutes the hinge pin of the tensioning lever.

This lever 5, as already stated, comprises a driving pawl 10, which like the holding pawl 9, also comprises a metal, and therefore rigid, blade, provided with two lateral protuberances, each able to move in a through aperture 12 provided in the lateral surfaces 31, 32 of the lever 5. Like the holding pawl 9, the driving pawl 10 is subject to the action of a resilient return member, formed in the case in point by a spring (not shown), that presses against a projection 38 issuing from the rear plate 33 (see FIG. 8), in order to cause the driving pawl 9 to thrust permanently against the teeth of the toothed wheels 7.

In other words, and as may be seen, for example, in FIG. 5, the two pawls: the holding pawl 9 and the driving pawl 10 respectively, are permanently engaged or, in other words, mesh with the teeth of the toothed wheels 7 because of the respective actions of the springs to which they are subject.

Thus, because of the particular orientation of the teeth, the pawls 9, 10 counter the rotation of the drum 4 in one particular direction, and in the case in point, as is shown in the figures, in the clockwise direction.

On the other hand, and again because of the orientation or particular profile of the teeth, this engagement of the pawls 9, 10 with the teeth does not counter the rotation of the drum 4 in the opposite direction, namely in the figures in the trigonometric direction.

Thus, when a user wishes to tension a strap, he actuates the lever 5 in a steady manner which, by means of the driving pawl 10, causes the drum 4 to rotate. Pulling the lever down against the base 1 to rotate the drum anew in order to obtain the required tension, is not detrimental to the previously obtained tension because of the engagement of the holding pawl 9 with the toothed wheels 7, keeping the drum in the position it was in when the tensioning lever 5 was previously actuated.

In accordance with the invention, the strap tensioning device also includes an unlocking lever 6, described in greater detail below.

This unlocking lever 6 is also hinged onto the drum 4. In accordance with one inventive feature, the unlocking device 6 can be actuated completely independently of the driving pawl 5.

This unlocking lever 6 comprises two lateral flanges 13 drilled at the centre thereof with a bore 39, whereof the internal diameter substantially matches the external diameter of the drum 4. The two flanges 13 are rigidly connected to one another by a plate 40, able to receive a grip zone 41 which can be snapped on.

Figure 3:
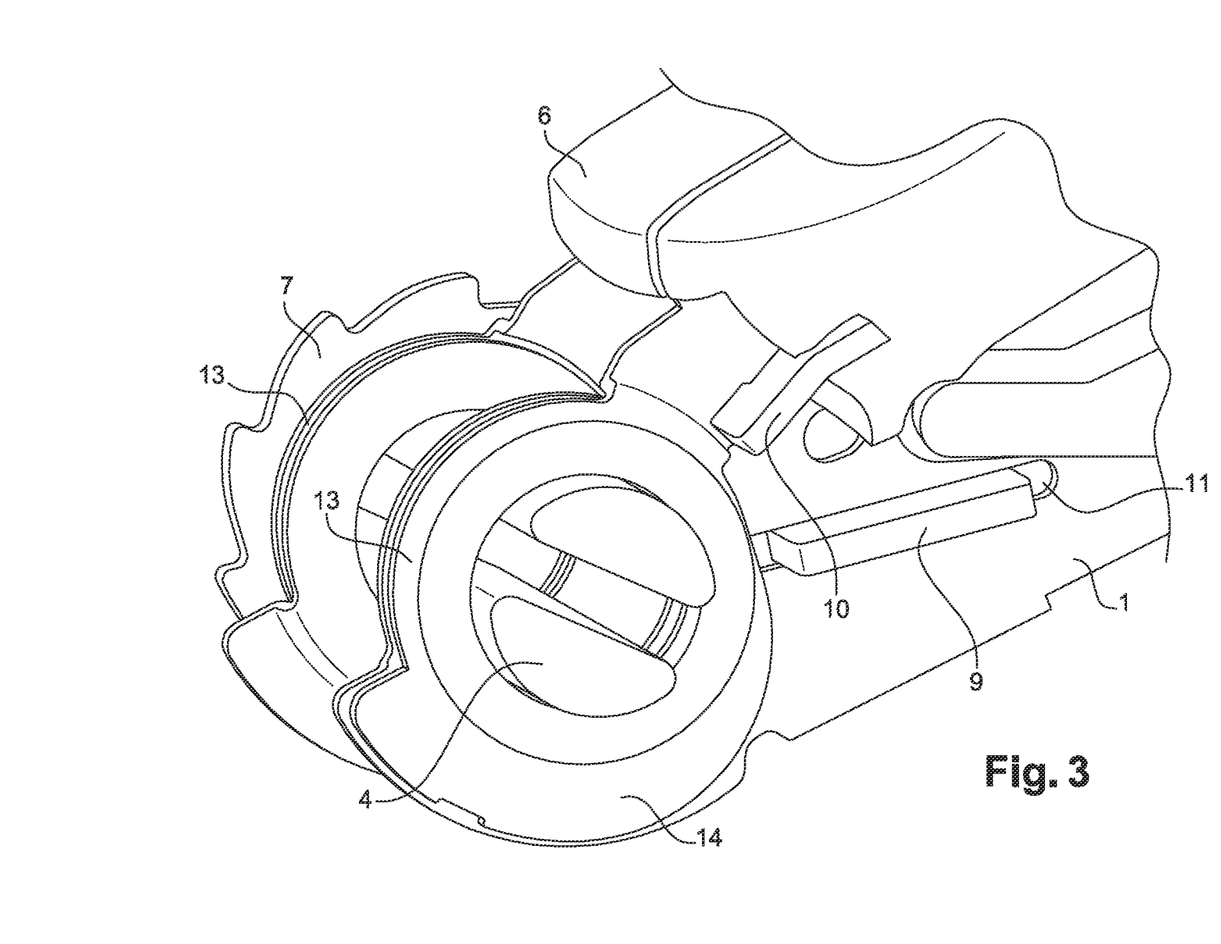
FIG. 3 is a diagrammatic perspective view showing in detail the cams associated with the unlocking lever.
Figure 4:
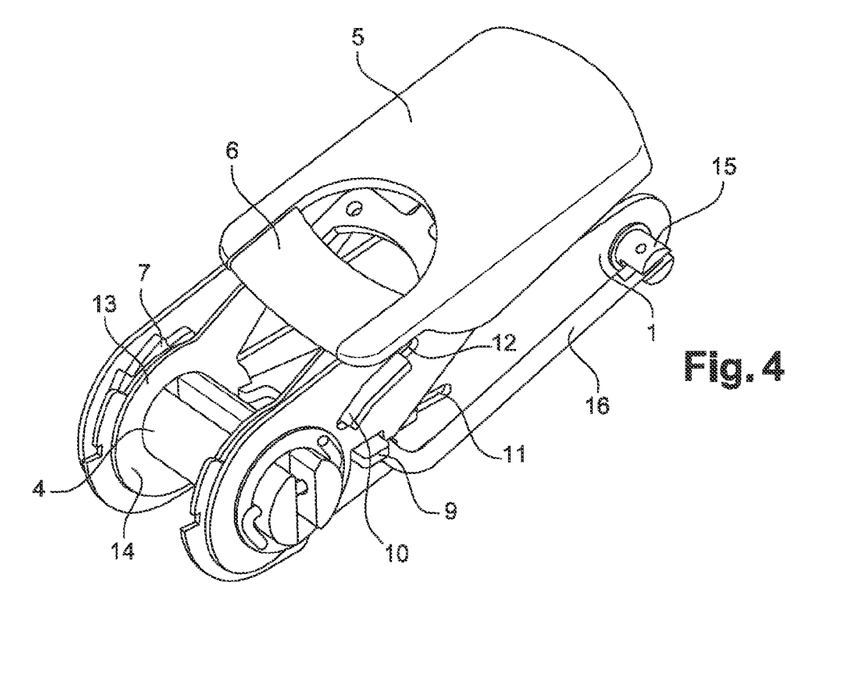
FIG. 4 is a view similar to FIG. 1 in another embodiment of the invention, in the closed position.

The periphery of each of the flanges 13 is extended by a cam-forming protuberance 14, of gradually increasing width, the gradual crease in the width of the cams also being orientated in the trigonometric direction in FIG. 3.

It is clear from these explanations as well as from the various figures, that the base 1, the tensioning lever 5 and the unlocking lever 6 are embedded within each other. These various elements are thus rotated relative to each other relative to the axis of rotation of the drum 4.

Figure 2:
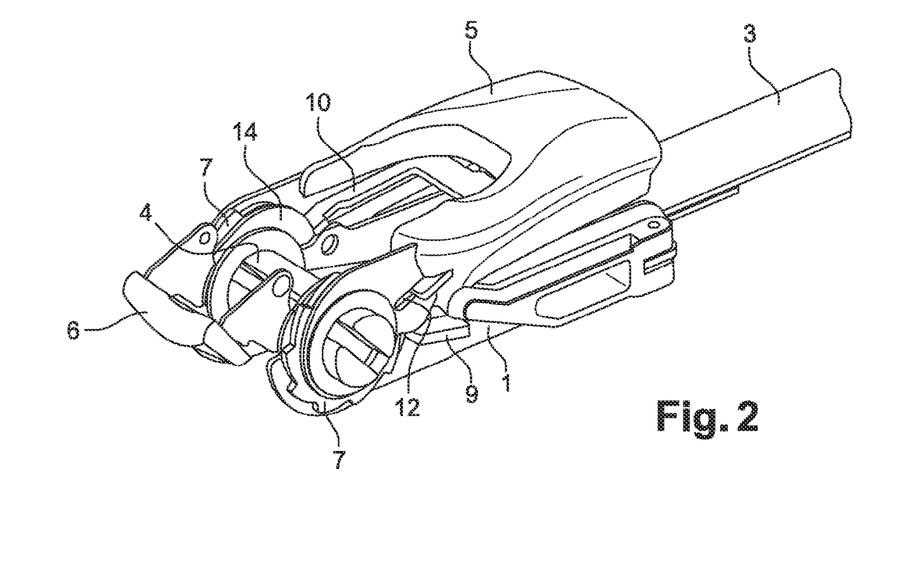
FIG. 2 is a view similar to FIG. 1 wherein the unlocking lever is in the operational unlocking position.

As may be clearly seen in FIG. 3, the cams 14 are intended to engage with the holding pawl 9 of the base 1, and the driving pawl 10 of the tensioning lever 5 respectively. Thus, when the unlocking lever 6 is actuated, and in the case in point as shown in FIG. 2, the cams thrust the two pawls 9, 10, which slide in their respective apertures, releasing them from their engagement with the toothed wheels 7. The drum 4 is then once again free in rotation thereby unlocking the tension previously provided by the inventive tensioning device.

It is in fact easy to understand the extreme simplicity of releasing the tension imparted to the strap or straps by using the inventive device, merely by actuating this unlocking lever, the cams which are associated therewith acting as power reduction system.

When it is wished once again to tension the strap or straps, the unlocking lever 6 has only to be towered towards the base 1, as shown in FIGS. 1, 4 to 6, in order to eliminate the engagement of the cams 14 with the end of the holding and driving pawls, so that they re-engage with the toothed wheels 7, and restrict the rotation of the drum 4 only in the direction of the tension.

Figure 6:
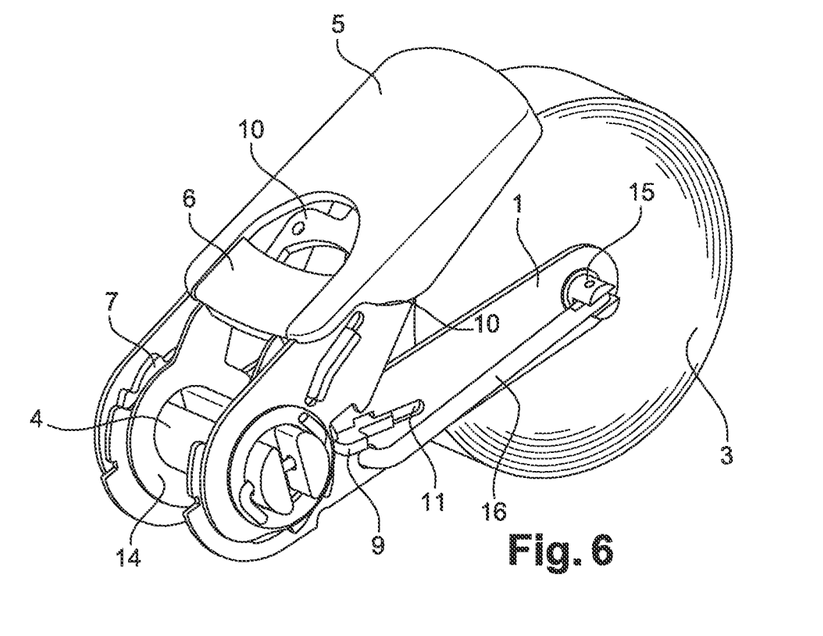
FIGS. 6 and 7 are respective views showing the storage of a strap in the device of FIG. 4 in accordance with the invention.
Figure 7:
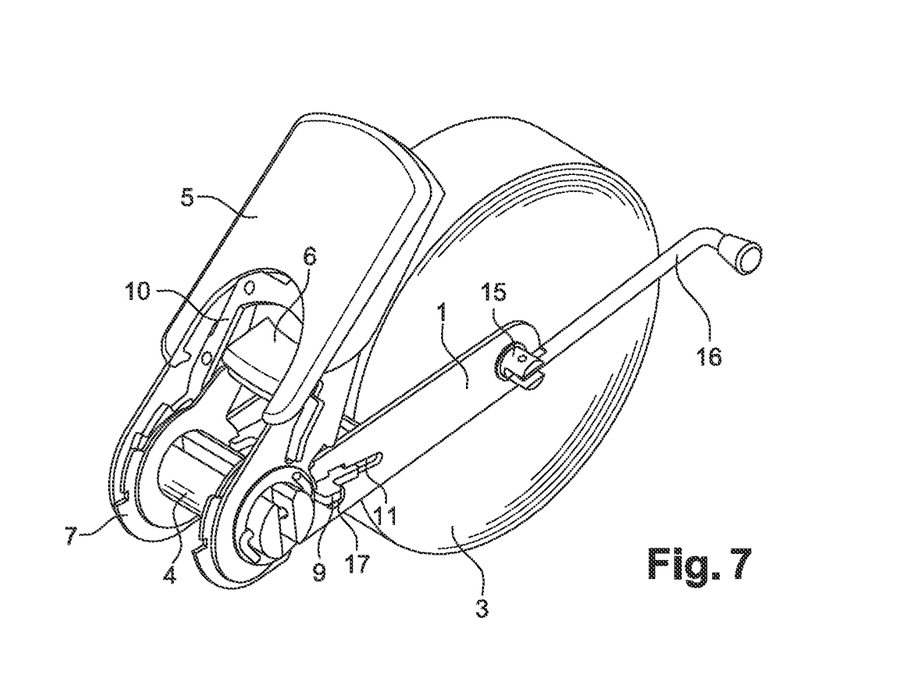

Advantageously, the strap 3 is rigidly connected to the base 1 on a rotatable axis 15, accommodated in the lateral surfaces 18, 19, that can be manually actuated by a crank 16, hinged onto one of the ends of the axis. It is thus possible to store the strap 3 on this axis, as is shown in FIGS. 6 and 7, and not on the axis providing the tension, in the case in point the drum 4.

Storage of the strap on the inventive tensioning device is thus facilitated, since, because of the relative distance of the storage axis 15 from the remainder of the device, it is typically possible to store some five metres in length of strap, which could not be achieved with prior art devices.

Incidentally, the crank 16 may be locked against the base 1 when it is not in use, by inserting its free end into a through aperture 17, provided on one of the lateral walls of the base 1.

It is easy to understand the full advantage of the inventive device, which facilitates the use of the tensioning member, without significant effort, and in complete safety.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A strap-tensioning device comprising:
    a base;
    a strap rigidly connected to a first end of the base;
    a drum mounted for rotation to a second end of the base, the drum configured to receive an end of the strap;
    wheels to which the drum is rigidly connected;
    a first pawl configured to slide in the base and to which the wheels engage under the action of a first biasing force;
    a tensioning lever rotatably mounted to the drum, and provided with a second pawl configured to drive the wheels, the second pawl configured to mesh by default in the wheels under action of a second biasing force and also slide in the lever;
    an unlocking lever configured to release the wheels from respective engagement thereof with the first pawl and with the second pawl, the unlocking lever being rotatably mounted for actuation independently of the rotation of the tensioning lever, by hinging onto the drum; and
    cams to which the unlocking lever is rigidly connected, the cams configured to simultaneously engage, respectively, with the first pawl and with the second pawl to release the rotation of the drum.

2. The strap-tensioning device of claim 1, wherein an end of the strap is secured to the base, the end being mounted on an axis configured to wind and store the strap.

3. The strap-tensioning device of claim 2, further comprising a crank configured to rotate the axis.

4. The strap-tensioning device of claim 3, wherein the crank is hinged on an end of the axis.

5. The strap-tensioning device of claim 4, wherein the crank is configured locking against the base when not in use by inserting a free end of the crank into a through aperture provided in the base.

6. The strap-tensioning device of claim 1, wherein the tensioning lever is rotatably mounted to the drum by hinged connection.

7. The strap-tensioning device of claim 1, wherein the wheels comprise toothed wheels.

8. A strap-tensioning device comprising:
    a base;
    a drum received by the base for rotation with respect thereto;
    a strap having a first end connected to the drum and a second end;
    wheels to which the drum is rigidly connected such that rotation of the wheels results in simultaneous rotation of the drum;
    a first pawl received in the base and configured to engage the wheels;
    a tensioning lever hingedly connected to the drum and configured to drive the wheels, the tensioning lever having a second pawl configured to engage by default the wheels;
    an unlocking lever configured to release the wheels from respective engagement thereof with the first pawl and with the second pawl, the unlocking lever being mounted for actuation independently of the tensioning lever; and
    cams to which the unlocking lever is operatively connected, the cams configured to simultaneously engage, respectively, the first pawl and the second pawl to release rotation of the drum.

9. The strap-tensioning device of claim 8, wherein each wheel has a first wheel orifice and a second wheel orifice.

10. The strap-tensioning device of claim 9, wherein the drum comprises a first drum section connected to the first wheel orifice.

11. The strap-tensioning device of claim 10, wherein the drum comprises a second drum section connected to the second wheel orifice such that the second drum section is spaced from the first drum section.

12. The strap-tensioning device of claim 11, wherein the first end of the strap is received in the space between the first drum section and the second drum section.

13. The strap-tensioning device of claim 8, wherein the base comprises:
    a first base portion;
    a second base portion extending in parallel to and spaced from the first base portion; and
    a base plate which connects the first base portion and the second base portion to each other.

14. The strap-tensioning device of claim 13, wherein an end of the first base portion and an end of the second base portion each define a flange having a central bore.

15. The strap-tensioning device of claim 14, wherein the drum is received in the flange of the first base portion and the second base portion.

16. The strap-tensioning device of claim 13, wherein the tensioning member comprises:
    a first tensioning member portion;
    a second tensioning member portion extending in parallel to and spaced from the first base portion; and
    a tensioning member plate which connects the first tensioning member portion and the second tensioning member portion to each other.

17. The strap-tensioning device of claim 16, wherein an end of the first tensioning member portion and an end of the second tensioning member portion each define a flange having a central bore.

18. The strap-tensioning device of claim 16, wherein the drum is received in the flange of the first tensioning member portion and the second tensioning member portion.

19. A strap-tensioning device comprising:
    a base having a pair of spaced apart base portions;
    wheels each having a pair of wheel orifices extending therethrough;
    a drum having a pair of drum sections, each drum section respectively connected to a wheel orifice such that the drum sections are spaced from each other;
    a strap having a first end received in the space between the drum sections;

an axis extending between and through the base portions and configured to wind and store the strap;

a first pawl received in the base and configured to engage the wheels;

a tensioning lever hingedly connected to the drum and configured to drive the wheels, the tensioning lever having a second pawl configured to engage by default the wheels;

an unlocking lever configured to release the wheels from respective engagement thereof with the first pawl and with the second pawl, the unlocking lever being mounted for actuation independently of the tensioning lever; and cams to which the unlocking lever is operatively connected, the cams configured to simultaneously engage, respectively, the first pawl and the second pawl to release rotation of the drum.

20. The strap-tensioning device of claim 19, further comprising a crank configured to rotate the axis.

* * * * *